July 23, 1935.  W. McCLINTOCK  2,008,722
PRESSURE REGULATING AND REDUCING DEVICE
Filed Dec. 14, 1933  2 Sheets-Sheet 1
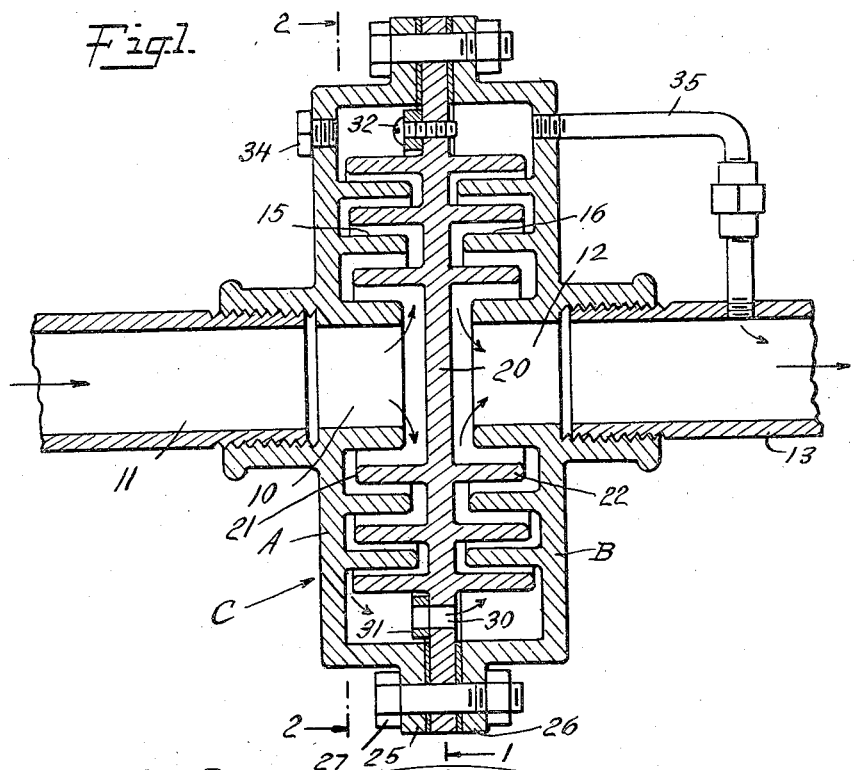
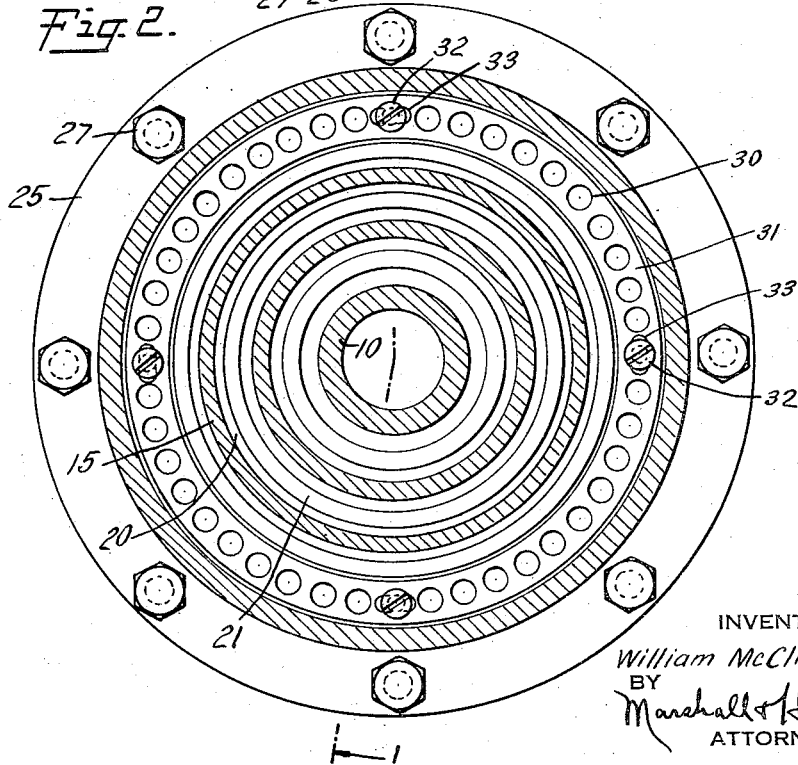
INVENTOR
William McClintock
BY
Marshall & Hawley
ATTORNEYS July 23, 1935. W. McCLINTOCK 2,008,722
PRESSURE REGULATING AND REDUCING DEVICE
Filed Dec. 14, 1933 2 Sheets-Sheet 2

INVENTOR
William McClintock
BY
ATTORNEYS

Patented July 23, 1935

2,008,722

UNITED STATES PATENT OFFICE 2,008,722

PRESSURE REGULATING AND REDUCING DEVICE

William McClintock, Bronx, N. Y.

Application December 14, 1933, Serial No. 702,335

11 Claims. (Cl. 137—75)

This invention relates to fluid pressure regulating and reducing devices and particularly to a device for reducing the velocity of liquid flowing through a piping system.

In water systems and particularly in the piping for toilet flush tanks the water flows or rushes into the tanks at such high pressures or velocities as to cause considerable noise. This is objectionable and there is no necessity for such high pressures. Furthermore, the elimination of the noise is highly desirable.

This invention has for its salient object to provide a device of the character mentioned so constructed and arranged that the rate of flow of the liquid through the device can be reduced and can be adjustably regulated.

Another object of the invention is to provide a device of the character described so constructed and arranged that the velocity reducing or pressure regulating elements can be increased or decreased, thus providing a construction that can be adapted for the particular system in which it is to be installed.

Further objects of the invention will appear from the following specification taken in connection with the drawings which form a part of this application, and in which Fig. 1 is a sectional elevation of the device construction in accordance with the invention, taken substantially on line 1—1 of Fig. 2;

Fig. 2 is a sectional elevation taken substantially on line 2—2 of Fig. 1;

Figure 3:
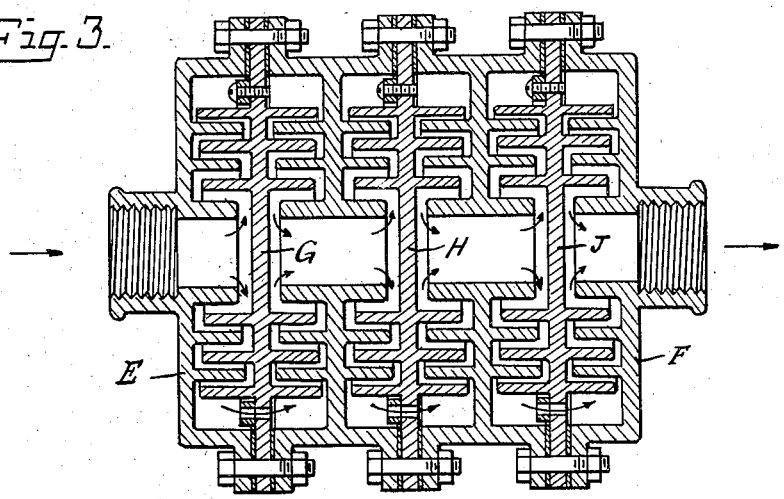
Fig. 3 is a sectional elevation similar to Fig. 1, but showing a plurality of sets of elements for reducing the fluid pressure or velocity.

The invention briefly described consists of a device comprising a casing in which are housed oppositely extending ribs which form undulating or tortuous paths for the liquid through which the liquid must pass from its inlet opening to the outlet opening. Intermediate the tortuous paths are provided openings the size of which can be regulated thereby controlling the rate of flow of the liquid.

Further details of the invention will appear from the following description.

In the embodiment of the invention illustrated in Figs. 1 and 2 the device comprises a casing C which is made up of a pair of members A and B. The member A has a central inlet opening 10 to which is connected an inlet pipe 11 and the member B has a central outlet opening 12 to which is connected an outlet pipe 13.

The members A and B have formed thereon a plurality of concentric ribs 15 and 16 which are disposed parallel to the central axis of the casing and extend toward each other.

Intermediate the members A and B there is secured a central plate 20 having formed thereon and extending from the opposite surfaces thereof a plurality of concentric ribs 21 and 22. The ribs 21 and 22 are staggered with respect to the ribs 15 and 16 and are disposed parallel thereto, and, as shown in Fig. 1, the ribs 21 overlap the ribs 15 and the ribs 22 overlap the ribs 16. Thus it will be seen that tortuous or undulating paths of flow for the liquid are provided between the members A and B and the central member 20. In the form of the invention shown in Fig. 1 the oppositely extending ribs 15 and 21 and 16 and 22 are so spaced that the outer ribs are spaced apart a less distance than those toward the central axis of the device thus restricting the path of flow of the liquid.

The plate 20 extends outwardly between flanges 25 and 26 formed on the members A and B and these parts are secured together by a suitable means such as bolts 27. The plate is provided with a series of annular openings 30 and the size of these openings can be regulated by the peripheral adjustment of a flat ring 31 having openings therein corresponding in size to the openings 30. The ring is held in position by screws 32 and after the screws are loosened the ring can be adjusted by the slotted connection 33 to enlarge or decrease the size of the openings 30. In order to give access to the screws 32 the member A has a removable plug 34 opposite each screw. When the water is shut off the plugs can be removed, the screws loosened and ring adjusted. The screws are then tightened and plugs replaced. A vent pipe 35 is connected to casing member B and preferably communicates with outlet pipe 20.

In Fig. 1 the liquid enters through the conduit 11 and then passes outwardly through the tortuous passage between the ribs 15 and 21, through the openings 30 and then inwardly through the tortuous passage between the ribs 16 and 22 to the center of the casing, the liquid then passing outwardly through the outlet conduit 13. It will be obvious that the passage of the liquid through tortuous paths and the friction of the liquid during this passage will materially reduce the velocity or flowing pressure thus eliminating noise.

The form of the invention illustrated in Fig. 3 is substantially the same as that illustrated in Fig. 2 except that three sets of pressure reducing elements have been provided. In this embodiment the ends of the casing are shown at E and F and between these ends are disposed three plates G, H and J. Each of these plates has concentric rings extending from the opposite surfaces thereof which coact with other concentric rings to form tortuous passages for the liquid. It will be obvious that as many sets of pressure reducing elements can be assembled as desired and that the device shown in Fig. 3 will operate in the same manner as that shown in Fig. 1, but will effect a greater reduction in the velocity of the fluid due to the successive action of the pressure reducing elements. Each of the plates is provided with a series of openings which are adjustably controlled as to size by plates similar to the plate 31 shown in Figs. 1 and 2.

Figure 4:
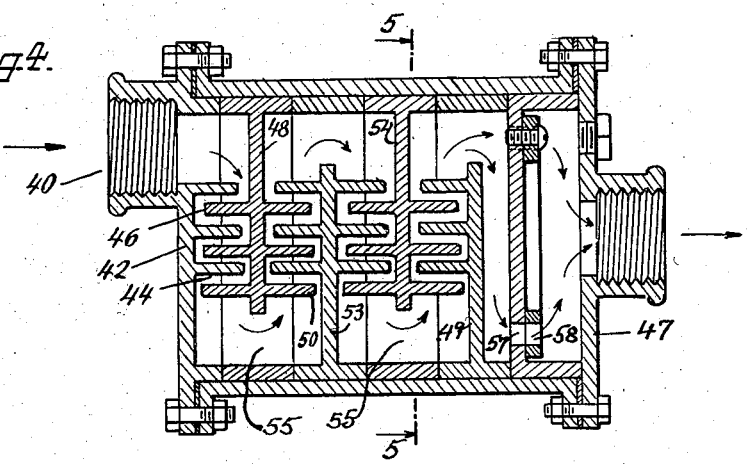
Fig. 4 is a sectional elevation similar to Fig. 1, but showing a slightly modified form of the invention.
Figure 5:
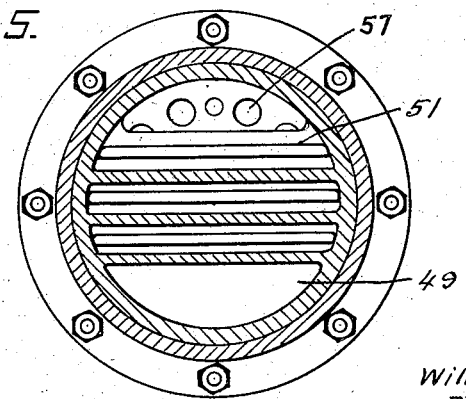
Fig. 5 is a sectional elevation taken substantially on line 5—5 of Fig. 4.

Figs. 4 and 5 illustrate a slightly different form of the invention. In this embodiment the inlet opening 40 is disposed adjacent one wall of the casing and the outlet opening 41 is disposed centrally of the casing. The end 42 of the casing is provided with parallel ribs 44 which coact with parallel ribs 46 which extend toward the end 42 parallel to the ribs 44. The ribs 46 are formed on a plate 48 having ribs 50 extending laterally from the opposite surface thereof. Two other plates 53 and 54 are disposed in the casing between the plate 48 and a plate 49 and are provided with parallel ribs coacting in the manner above described to form tortuous passages. Plate 49 has parallel ribs coacting with ribs on plate 54. The plates 48, 53, 54 and 49 are provided with openings 55. A plate 45 is disposed between plate 49 and the end 47 of the casing and has a series of openings 57 which are adjustably controlled by a ring 56 having openings 58 therethrough which may register with or partially overlap the openings 57.

In the form of the invention shown in Figs. 4 and 5 the liquid enters through the opening 40, passes downwardly in the tortuous passage formed between the parallel ribs 44 and 46, thence through the opening 55 upwardly between the next set of coacting ribs, through the next opening 55 and thence successively downwardly, upwardly and downwardly, leaving the casing through adjustable openings 57 and the outlet opening 41.

From the foregoing description it will be clear that in each form of the invention simple and practical means has been provided for reducing the flowing pressure or velocity of liquid passing through the device and it will also be evident that the device can be built up in such a manner as to interpose any desired number of tortuous paths through which the liquid must pass. The rate of flow can also be regulated by adjusting the size of the openings within the casing through which the liquid must pass.

Although certain specific embodiments of the invention have been particularly shown and described it will be understood that the invention is capable of modification and that changes in the construction and in the arrangement of the various cooperating parts may be made without departing from the spirit or scope of the invention, as expressed in the following claims.

What I claim is:

1. A device for reducing the rate of flow of liquid through a piping system comprising a casing, an inlet opening at one end and an outlet opening at the other end thereof, means in the casing between said inlet and outlet openings for conducting the liquid in tortuous paths outwardly away from and inwardly toward the central axis of the casing, and adjustable means at the outer end portions of said paths for regulating the flow of liquid through the casing.

2. A device for reducing the rate of flow of liquid through a piping system comprising a casing, an inlet opening at one end and an outlet opening at the other end thereof, means including members having oppositely extending ribs forming tortuous paths in the casing between said inlet and outlet openings for conducting the liquid outwardly away from and inwardly toward the central axis of the casing, and adjustable means at the outer end portions of said paths for regulating the flow of liquid through the casing.

3. A device for reducing the rate of flow of liquid through a piping system comprising a casing, an inlet opening at one end and an outlet opening at the other end thereof, means including members having oppositely extending, concentric, annular ribs forming tortuous paths in the casing between said inlet and outlet openings for conducting the liquid outwardly away from and inwardly toward the central axis of the casing, and adjustable means at the outer end portions of said paths for regulating the flow of liquid through the casing.

4. A device for reducing the rate of flow of liquid through a piping system comprising a casing, an inlet opening at one end and an outlet opening at the other end thereof, and a rigid member fixed in the casing having oppositely extending spaced rigid ribs, rigid ribs on the ends of the casing extending in directions opposite to said first mentioned ribs and extending into the spaces between them to form tortuous passages for the liquid from the inlet opening outwardly and then inwardly to the outlet opening.

5. A device for reducing the rate of flow of liquid comprising a casing, having a wall and end plates, an inlet opening in one plate and an outlet opening in the other plate, an intermediate plate between the end plates, ribs on the intermediate plate extending laterally in opposite directions from the opposite surfaces thereof, ribs on the end plates extending toward the intermediate plate and in staggered relation to the ribs thereon, and adjustable means at the outer portion of the intermediate plate for regulating the flow of liquid.

6. A device for reducing the rate of flow of liquid comprising a casing having a wall and end plates, an inlet opening in one plate and an outlet opening in the other plate, an intermediate plate between the end plates, concentric ribs on the intermediate plate extending laterally in opposite directions from the opposite surfaces thereof, concentric ribs on the end plates extending toward the intermediate plate and in staggered relation to the ribs thereon, and adjustable means at the outer portion of the intermediate plate for regulating the flow of liquid.

7. A device for reducing the rate of flow of liquid through a piping system comprising a casing, an inlet opening at one end and an outlet opening at the other end thereof in alinement with the inlet opening, and means including rigid members having oppositely extending, concentric, spaced annular, rigid ribs, said ribs being disposed in overlapping relation to form tortuous paths in the casing between said inlet and outlet openings for conducting the liquid outwardly away from and inwardly toward the central axis of the casing.

8. A device for reducing the rate of flow of liquid through a piping system comprising a casing, an inlet opening at one end and an outlet opening at the other end thereof, means in the casing between said inlet and outlet openings for conducting the liquid in tortuous paths outwardly away from and inwardly toward the central axis of the casing, adjustable means at the outer end portions of said paths for regulating the flow of liquid through the casing, and removable members in said casing for affording access to said adjustable means.

9. A device for reducing the rate of flow of liquid comprising a casing having an inlet opening in one end thereof and an outlet opening in the other end thereof, a member in the casing intermediate the ends having adjustable openings controlling the communication between the spaces on opposite sides of the member, and means in the casing forming tortuous paths for the liquid in its passage through the casing.

10. A device for reducing the rate of flow of liquid comprising a casing having an inlet opening in one end thereof and an outlet opening in the other end thereof in alinement with the inlet opening, a member in the casing intermediate the ends having adjustable openings controlling the communication between the spaces on opposite sides of the member, and means in the casing forming tortuous paths for the liquid in its passage through the casing.

11. A device for reducing the rate of flow of liquid through a piping system comprising a casing, an inlet opening at one end and an outlet opening at the other end thereof, a rigid member transversely disposed in the casing having oppositely extending spaced rigid ribs, said member being constructed to form passages through it near its outer edge, rigid ribs on the ends of the casing adjacent said member extending in directions opposite to said first mentioned ribs and extending into the spaces between them to form tortuous passages for the liquid from the inlet opening outwardly, through said passages and then inwardly to the outlet opening.

WILLIAM McCLINTOCK.